United States Patent Office 2,831,017
Patented Apr. 15, 1958

2,831,017

CHLOROHYDROXYBENZOPHENONE ESTERS OF α,α-DICHLOROPROPIONIC ACID

Herman O. Senkbeil, Midland, Mich., assignor to The Dow Chemical Company, Midland, Mich., a corporation of Delaware No Drawing. Application January 3, 1957
Serial No. 632,267

5 Claims. (Cl. 260—479)

This invention relates to the chlorohydroxybenzophenone esters of α,α-dichloropropionic acid having the formula

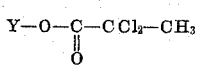

In this and succeeding formulas, Y represents a radical having the formula

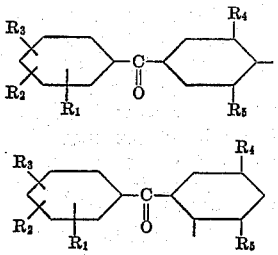

or

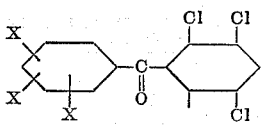

wherein one of the symbols $R_1$, $R_2$, $R_3$, $R_4$ and $R_5$ represents chlorine and each remaining R symbol represents hydrogen or chlorine, and each X represents chlorine or hydrogen. These compounds are viscous liquids or crystalline solids somewhat soluble in many organic solvents and of low solubility in water. They have been found to be active as plant growth control materials and are adapted to be employed for the control of the growth and killing of weeds and for the sterilization of soil with regard to the growth of plants. They are also useful as parasiticides for the control of insect and bacterial organisms such as *Staphylococcus aureus* and *Penicillium digitatum*.

The new compounds may be prepared by reacting together (1) α,α-dichloropropionic anhydride and (2) a chlorohydroxybenzophenone having the formula

such as 4′ - chloro - 2 - hydroxybenzophenone (melting point=76° C.), 2′,4′ - dichloro - 4 - hydroxybenzophenone (melting point=140° C.), 2′,3,5 - trichloro -2 -hydroxybenzophenone (melting point=90° C.), 2′,4′,5-trichloro - 2 - hydroxybenzophenone (melting point=98° C.), 3,5 - dichloro - 2 - hydroxybenzophenone (melting point=114° C.), 2′,3,4′ - trichloro - 2 - hydroxybenzophenone (melting point=108° C.), 2′,3,5,6 - tetrachloro-2-hydroxybenzophenone (melting point=96° C.) and 3,3′,4′,5,6-pentachloro-2-hydroxybenzophenone (melting point=216° C.). The reaction takes place smoothly at the temperature range of from 80° to 200° C. with the production of the desired ester and α,α-dichloropropionic acid of reaction. Good results are obtained when employing substantially equimolecular proportions of the reactants. A large excess of the acid anhydride may be employed in the reaction mixture since such excess does not appreciably effect the course of the reaction. The removal from the reaction zone of the α,α - dichloropropionic acid of reaction as formed generally results in optimum yields of the desired ester products.

In carrying out the reaction, the chlorohydroxybenzophenone and α,α-dichloropropionic anhydride are mixed together and the resulting mixture heated at a temperature of from 80° to 200° C. for a period of time to complete the reaction. The heating may be carried out under reduced pressure and at a temperature at which the α,α-dichloropropionic acid of reaction boils to effect the removal of by-product α,α-dichloropropionic acid as formed. Upon completion of the reaction, the reaction mixture may be fractionally distilled under reduced pressure to remove low boiling constituents and obtain the desired product as a liquid or solid residue. When the product is a solid, it may be purified by recrystallization from various organic solvents.

The following examples illustrate the invention but are not to be construed as limiting:

*Example 1.—4-(2,4-dichlorobenzoyl) phenyl α,α-dichloropropionate*

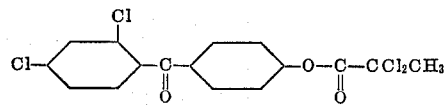

A mixture of 30.5 grams (0.114 mole) of 2′,4′-dichloro-4-hydroxybenzophenone and 32.1 grams (0.12 mole) of α,α-dichloropropionic anhydride was heated slowly with stirring at temperatures gradually increasing up to 145° C. and at a reduced pressure of 10 millimeters. The heating was carried out with the continuous distillation of the α,α-dichloropropionic acid of reaction as formed and until no further substantial amounts of acid were liberated. The reaction mixture was then heated under reduced pressure at gradually increasing temperatures up to a temperature of 195° C. at 0.1 millimeter pressure to remove low boiling constituents and obtain a 4-(2,4-dichlorobenzoyl) phenyl α,α - dichloropropionate product as a viscous liquid residue. This product had a chlorine content of 35.6 percent and a saponification equivalent of 201 as compared to the calculated values of 36.2 percent and 196.

*Example 2.—4,6-dichloro-2-(2-chlorobenzoyl) phenyl α,α-dichloropropionate*

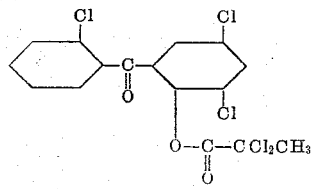

A mixture of 26 grams (0.086 mole) of 2′,3,5-trichloro-2-hydroxybenzophenone and 50 grams (0.186 mole) of α,α-dichloropropionic anhydride was heated with stirring at a temperature of from 107° to 127° C. and at a pressure of from 8–10 millimeters. The α,α-dichloropropionic acid of reaction was continuously removed as formed during the heating period. When the evolution of α,α-dichloropropionic acid was substantially complete the reaction mixture was cooled to room temperature. During the cooling a 4,6-dichloro-2-(2-chlorobenzoyl) phenyl α,α-dichloropropionate product precipitated in the mixture as a white solid. This solid after recrystallization from ethanol was found to melt at 81°–83° C. and had a chlorine content of 40.8 percent as compared to the theoretical value of 41.6 percent.

*Example 3.—4-chloro-2-(2,4-dichlorobenzoyl) phenyl α,α-dichloropropionate*

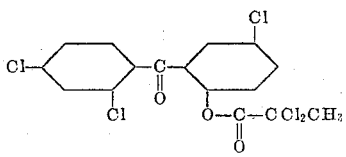

15.5 grams (0.0514 mole) of 2′,4′,5 - trichloro-2-hydroxybenzophenone and 27.6 grams (0.103 mole) of α,α-dichloropropionic anhydride were mixed and heated with stirring at a temperature of 80° C. for a period of 20 hours. The reaction mixture was then heated at temperatures gradually increasing up to 148° C. at 8 millimeters' pressure to remove the by-product α,α-dichloropropionic acid formed and low boiling constituents to obtain a 4-chloro-2-(2,4 - dichlorobenzoyl) phenyl α,α - dichloropropionate product as a liquid residue having a chlorine content of 41.8 percent as compared to the calculated content of 41.57 percent. 4-chloro-2-(2,4-dichlorobenzoyl) phenyl α,α-dichloropropionate has a molecular weight of 427.

*Example 4.—4,6-dichloro-2-benzoylphenyl α,α-dichloropropionate*

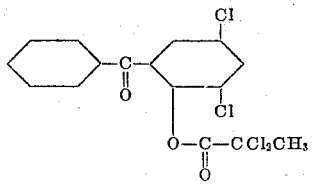

α,α-Dichloropropionic anhydride (26.8 grams, 0.1 mole) was mixed with 20.3 grams (0.076 mole) of 3,5-dichloro-2-hydroxybenzophenone and the resulting mixture heated with stirring at gradually increasing temperatures up to 196° C. at a pressure of 7 millimeters. During the heating period, the α,α-dichloropropionic acid was continuously removed as formed by distillation to obtain a 4,6-dichloro-2-benzoylphenyl α,α-dichloropropionate product as a viscous liquid residue. This product was found to contain 36.1 percent chlorine compared to the theoretical value of 36.2 percent. 4,6-dichloro-2-benzoylphenyl α,α-dichloropropionate has a molecular weight of 392.

In a similar manner, other chlorohydroxybenzophenone esters of α,α-dichloropropionic acid may be prepared of which the following are representative:

2-(4-chlorobenzoyl) phenyl α,α-dichloropropionate by the reaction of 4′-chloro-2-hydroxybenzophenone and α,α-dichloropropionic anhydride.

3 - chloro - 2 - (2 - chlorobenzoyl) phenyl α,α - dichloropropionate by the reaction of 2′,3-dichloro-2-hydroxybenzophenone (melting point=76° C.) and α,α-dichloropropionic anhydride.

4,6 - dichloro - 2 - (4 - chlorobenzoyl) phenyl α,α-dichloropropionate by the reaction of 3,4′,-5-trichloro-2-hydroxybenzophenone (melting point=110° C.) and α,α-dichloropropionic anhydride.

4,6 - dichloro - 2 - (3,4-dichlorobenzoyl) phenyl α,α-dichloropropionate by the reaction of 3,3′,4′,5-tetrachloro-2-hydroxybenzophenone (melting point=193° C.) and α,α-dichloropropionic anhydride.

3,4,6-trichloro-2-(3,4-dichlorobenzoyl) phenyl α,α-dichloropropionate by the reaction of 3,3′,4′,5,6-pentachloro-2-hydroxybenzophenone (melting point=216° C.) and α,α-dichloropropionic anhydride.

4-(2-chlorobenzoyl) phenyl α,α-dichloropropionate by the reaction of 2′-chloro-4-hydroxybenzophenone (melting point=125° C.) and α,α-dichloropropionic anhydride.

3-chloro-4-(4-chlorobenzoyl) phenyl α,α-dichloropropionate by the reaction of 3,4′-dichloro-2-hydroxybenzophenone (melting point=177° C.) and α,α-dichloropropionic anhydride.

3-chloro-4-(3,4-dichlorobenzoyl) phenyl α,α-dichloropropionate by the reaction of 3,3′,4′-trichloro-4-hydroxybenzophenone (melting point=210° C.) and α,α-dichloropropionic anhydride.

The new esters of the present invention are effective as herbicides for the killing of weeds and the sterilization of soil with regard to plant growth. They are also valuable as parasiticides and are adapted to be employed for the control of insect and bacterial organisms such as *Erwinia carotovora* and *Salmonella typhosa*. For such use, the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents in oil-in-water emulsions or aqueous dispersions with or without the addition of wetting, dispersing or emulsifying agents. In representative operations, complete inhibition of the growth of *Staphylococcus aureus*, *Salmonella typhosa*, *Erwinia carotovora* and *Penicillium digitatum* was obtained with aqueous solutions saturated with 4-chloro-2-(2,4-dichlorobenzoyl) phenyl α,α-dichloropropionate.

The chlorohydroxybenzophenones employed as starting materials in accordance with the present invention may be prepared by known methods such as by a Fries or Friedel-Crafts reaction. In the Friedel-Crafts reaction, phenol or a suitable chlorophenol is reacted with a suitable benzoyl chloride in the presence of aluminum chloride as a catalyst. In the Fries reaction, a suitable benzoate compound is heated in the presence of a small amount of aluminum chloride whereby the benzoate compound rearranges to the desired benzophenone starting material.

I claim:

1. A chlorohydroxybenzophenone ester of α,α-dichloropropionic acid having the formula

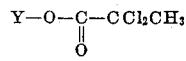

wherein Y represents a member of the group consisting of the radicals having the formulas

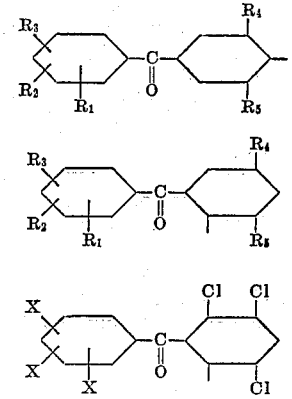

and in which one of the symbols $R_1$, $R_2$, $R_3$, $R_4$ and $R_5$ represents chlorine and each remaining R symbol represents a member of the group consisting of hydrogen and chlorine and each X represents a member of the group consisting of chlorine and hydrogen.

2. 4 - (2,4 - dichlorobenzoyl) phenyl α,α-dichloropropionate.

3. 4,6 - dichloro - 2 - (2 - chlorobenzoyl) phenyl α,α-dichloropropionate.

4. 4 - chloro - 2 - (2,4 - dichlorobenzoyl) phenyl α,α-dichloropropionate.

5. 4,6 - dichloro - 2 - benzoylphenyl α,α - dichloropropionate.

No references cited.